(12) United States Patent
Zamorano et al.

(10) Patent No.: US 10,000,144 B2
(45) Date of Patent: Jun. 19, 2018

(54) HOPPER TRANSPORTABLE IN PARTS AND ASSEMBLY METHOD

(71) Applicant: Minetec S.A., Santiago, Región Metropolitana (CL)

(72) Inventors: Claudio Zamorano, Santiago (CL); Bernardo Vera, Santiago (CL); Antonio Flores, Santiago (CL); Cristián Junge, Santiago (CL)

(73) Assignee: Minetec S.A., Santiago (CL)

( * ) Notice: Subject to any disclaimer, the term of this patent is extended or adjusted under 35 U.S.C. 154(b) by 10 days.

(21) Appl. No.: 15/262,252

(22) Filed: Sep. 12, 2016

(65) Prior Publication Data
US 2018/0022259 A1 Jan. 25, 2018

(30) Foreign Application Priority Data
Jul. 21, 2016 (CL) .................................. 1847-2016

(51) Int. Cl.
*B62D 33/02* (2006.01)
*B60P 1/28* (2006.01)
*B62D 65/02* (2006.01)

(52) U.S. Cl.
CPC ................ *B60P 1/28* (2013.01); *B62D 65/02* (2013.01)

(58) Field of Classification Search
CPC .. B62D 25/20; B62D 25/2036; B62D 25/025; B62D 25/2018; B62D 25/2027; B65D 90/623; B65D 88/28; F16K 27/0218; B05B 15/1248; B65H 2511/20
USPC ........................................................ 296/183.2
See application file for complete search history.

(56) References Cited

U.S. PATENT DOCUMENTS

| | | | | |
|---|---|---|---|---|
| 3,462,187 A * | 8/1969 | Hassler | ................... | B60P 1/286 105/418 |
| 3,923,337 A * | 12/1975 | Kershaw | ................. | B60P 1/286 296/183.2 |
| 4,162,096 A * | 7/1979 | Proeschl | ................ | B62D 33/02 296/193.04 |
| 6,481,785 B1 * | 11/2002 | Coleman | ................. | B60P 1/286 296/183.2 |
| 6,565,146 B2 * | 5/2003 | Fujan | ...................... | B60P 1/283 296/183.2 |
| 7,025,407 B2 * | 4/2006 | Medel | ..................... | B60P 1/283 296/181.3 |
| 7,207,621 B2 * | 4/2007 | D'Amico | ................ | B60P 1/286 296/183.1 |
| 7,434,868 B2 * | 10/2008 | D'Amico | ................ | B60P 1/286 296/183.1 |
| 7,481,483 B2 * | 1/2009 | D'Amico | ................ | B60P 1/286 296/183.1 |
| 7,901,009 B2 * | 3/2011 | Hagenbuch | ............. | B60P 1/286 296/183.2 |
| 8,651,580 B2 * | 2/2014 | Hagenbuch | ............. | B60P 1/286 298/1 B |

(Continued)

*Primary Examiner* — Kiran B Patel
(74) *Attorney, Agent, or Firm* — Hoffman Warnick LLC

(57) ABSTRACT

Embodiments of the invention relate to hoppers for heavy trucks and, more particularly, to hoppers capable of being moved in parts and methods for assembly thereof. In some embodiments, such hoppers comprise a front part, a hood in two parts, two side front parts, two intermediate side sections, two side floor sections, two central floor sections, base plates being joined by welds and secondary joints joined by bolted flanges.

3 Claims, 7 Drawing Sheets

(56) References Cited

U.S. PATENT DOCUMENTS

| | | | | |
|---|---|---|---|---|
| 8,770,651 B2* | 7/2014 | Hagenbuch | ........ | B62D 25/2045 296/184.1 |
| 9,108,558 B2* | 8/2015 | Hall | ........ | B60P 1/28 |
| 9,365,148 B2* | 6/2016 | Reynolds | ........ | B60P 1/286 |
| 9,434,231 B2* | 9/2016 | Hagenbuch | ........ | B60P 1/286 |
| 9,868,405 B1* | 1/2018 | Fischer | ........ | B60R 13/01 |
| 2002/0074848 A1* | 6/2002 | Feuereisen Azocar | ........ | B62D 33/02 298/24 |
| 2005/0242620 A1* | 11/2005 | McNulty | ........ | B62D 33/02 296/183.1 |
| 2009/0108633 A1* | 4/2009 | Ohi | ........ | B62D 25/20 296/204 |
| 2012/0086235 A1* | 4/2012 | Pinto | ........ | B60P 1/286 296/183.1 |
| 2014/0252801 A1* | 9/2014 | Hettinger | ........ | B60P 1/28 296/183.2 |
| 2015/0165957 A1* | 6/2015 | Sarangapani | ........ | B60P 1/286 296/183.2 |
| 2015/0375609 A1* | 12/2015 | Mirzaei | ........ | B60K 6/22 298/17 R |
| 2016/0194035 A1* | 7/2016 | Lu | ........ | B62D 25/2072 296/39.2 |

* cited by examiner

HOPPER TRANSPORTABLE IN PARTS AND ASSEMBLY METHOD

CROSS-REFERENCE TO RELATED APPLICATIONS

This application claims the benefit of co-pending Chilean Patent Application No. CL 1847-2016, filed 21 Jul. 2016, which is hereby incorporated herein.

TECHNICAL FIELD

This application relates to the field of hoppers for heavy trucks used mainly in mining, the invention specifically relates to a hopper which is moved in parts and a method for assembly in the construction site, consisting of base plate couplings by welding and secondary couplings (i.e., those not present in base plates) by bolted flanges.

DESCRIPTION OF THE PRIOR ART

Currently, the movement of mining hoppers is made from the place of manufacture to the construction site, whether assembled or in parts. Regarding the assembled hoppers, movement requires the use of special equipment for large loads. It is therefore necessary to hire companies using specialized equipment for this purpose, request for specific permits for transporting oversized loads, and accept a margin of risks of possible accidents that could occur. Meanwhile, regarding the hoppers moved in parts, the assembly on the construction site is a long and tedious process, requiring the use of cranes, which are very limited resource in a mining company, a fact which extends the assembly process for several days.

The normal assembly time for a typical hopper, having all the resources, is one week and a half, and can be extended up to four weeks in the absence of cranes. In a five-part assembly procedure, the use of cranes is required on five different days. Each of these days require a different coordination of cranes and therefore the risk of unavailability of these.

In the hopper of the present invention, the secondary couplings are joined by a flange system, allowing the hopper to be assembled in one day. In addition, the time spent from the purchase order to the operationalization of the component is minimized. Thus, an easy, fast and secure alternative for shipping a hopper using containers is obtained, because each hopper requires only two or three 40' containers, depending on the model; according to the needs, shipping can also be done on trucks or, in the marine case, a flat rack container.

The floor and side base plates are joined as a single solid, ensuring the highest structural quality and a minimum crane requirement in the construction site, only one day.

It is necessary to indicate that, in practice, a typical hopper of a mining truck is able to carry ten times the weight of its own structure.

In the prior art, the closest document is the invention patent application CL201102696, which deals with a mechanical hopper used for mining operations that do not use welds, which may be moved in parts and assembled in the construction site. Accordingly, the bolts are to support the workloads.

One of the most significant differences between the above mentioned invention patent application and the proposed application is related to the fact that, in the first one, the floor plates are joined using bolts. Whereas, in the second one, said plates are welded with full penetration, thus the hopper box is joined hopper as a solid, providing a much higher structural strength in relation to that provided by the first one.

Another difference is on the hopper's floor, since it is longitudinally split in the proposed invention. Whereas, the patent application CL201102696 claims a transversely split floor. Accordingly, the chassis described in the latter application is split and joined using bolts. For its part, the proposed application is manufactured welded, forming a single part that is completely welded to the floor, resulting in an improved performance. In addition, the longitudinal joint of floors allows the use of smaller flanges and fewer bolts. Said flanges, being exclusively installed on beams, work in compression, a reason why the bolts are an element of structural redundancy, increasing the product reliability.

It should be noted that, in the proposed invention, the bolted joints are located exclusively on the outside of the hopper box, a reason why anti-abrasive protectors are not required to protect the bolts, completely removing the risk of cutting them by wear. This feature is another great comparative advantage between both hoppers.

Furthermore, considering that, in the case of the hopper of the invention, the joints of plate bases are welded after the assembly, bolts work only during assembly, receiving loads of about 10% of the loads, compared to those received by the bolted joints described in the patent application CL201102696. The reason for this percentage is that flanges work in compression and, thus, the bolts of the proposed invention only work in the assembly process. It is then the welds the ones designed to support the load, not the bolts. In the application mentioned as the closest document in the prior art, one can verify the presence of a large amount of bolts, since they are intended to work in the use of the hopper.

DETAILED DESCRIPTION OF THE INVENTION

Figure 7:
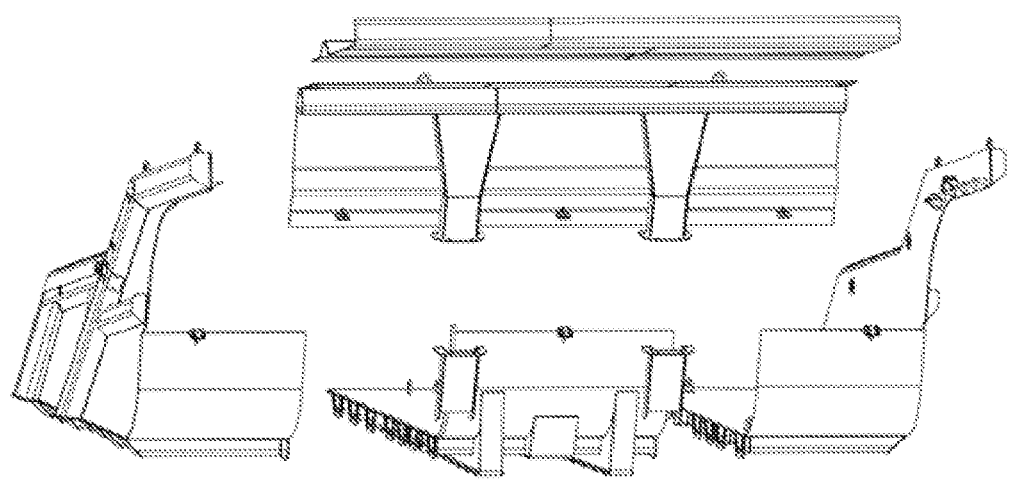
FIG. 7 shows another way of shipping the hopper, where it is split into 5 parts.
Figure 8:
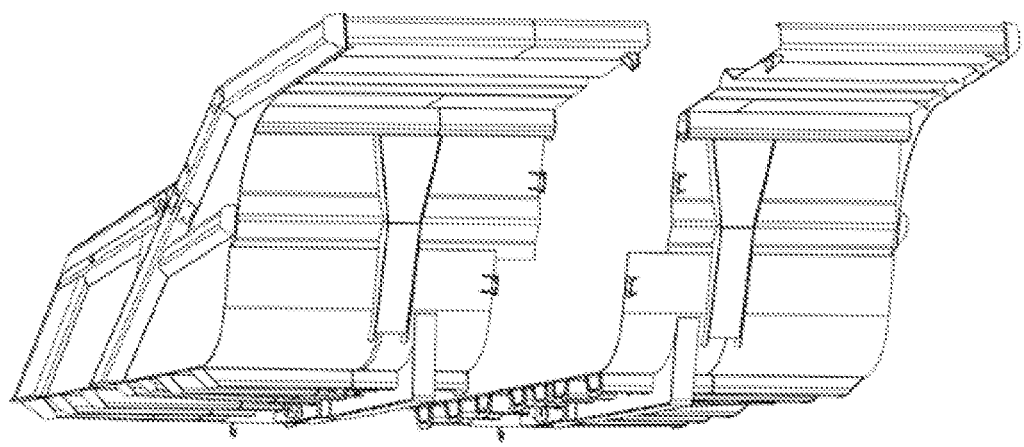
FIG. 8 shows another way of shipping the hopper, where it is split into 2 parts.

A hopper is disclosed which can be split for transport in 2-20 parts and a method for assembling hoppers which allow to achieve operationalization in two days. FIGS. 7 and 8 show other ways in which the hoppers are split into 5 and 2 parts, respectively. For the purposes of this invention and for a better explanation thereof, a hopper split into 11 parts is used, and the number of said parts may be increased or decreased according to hopper model for each particular case.

Figure 1:
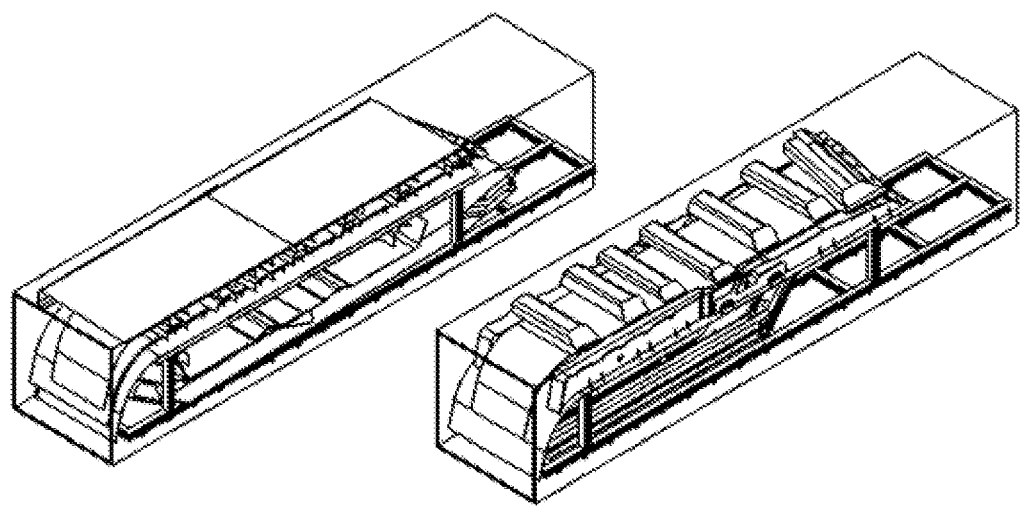
FIG. 1 shows the hopper of the invention that is moved in parts in two containers.
Figure 2:
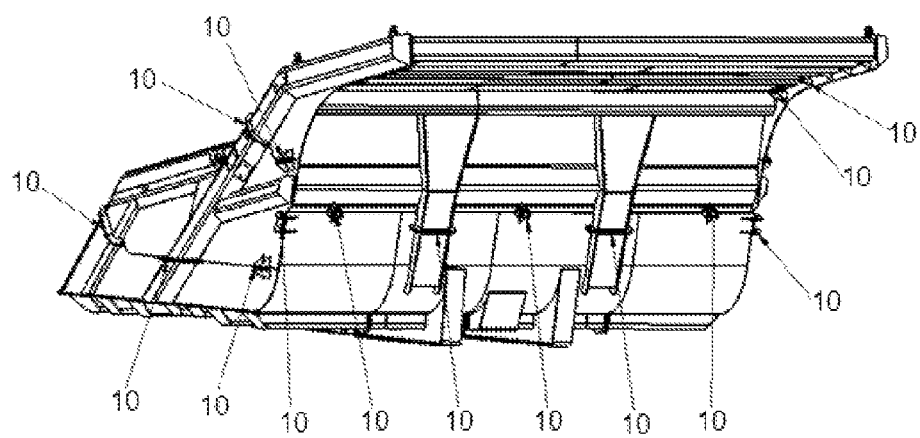
FIG. 2 shows a front isometric view of the finished assembled and welded hopper.

As shown in FIG. 1 for this case, each hopper is sent to the construction site, depending on the model, in two or three containers, disassembled.

Figure 3:
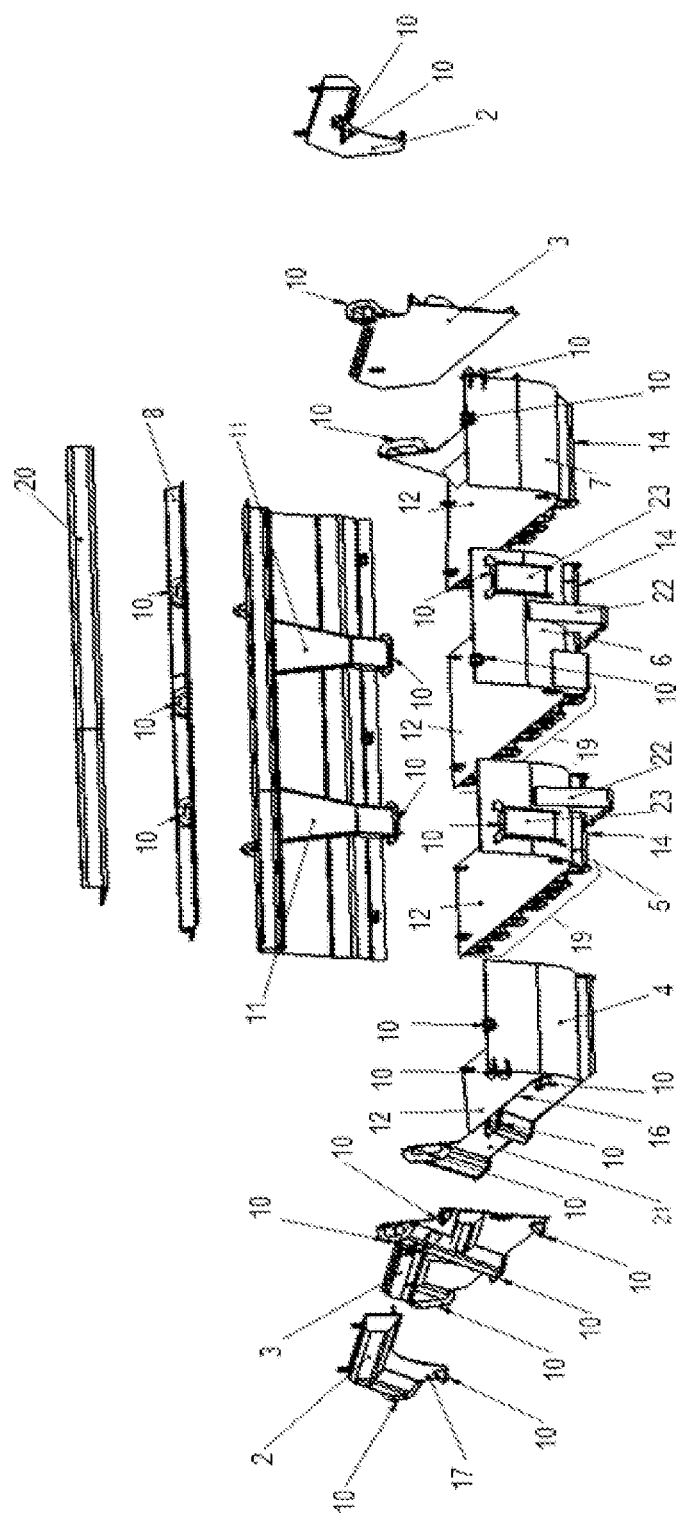
FIG. 3 shows a view of the disassembled hopper with its sections.
Figure 4:
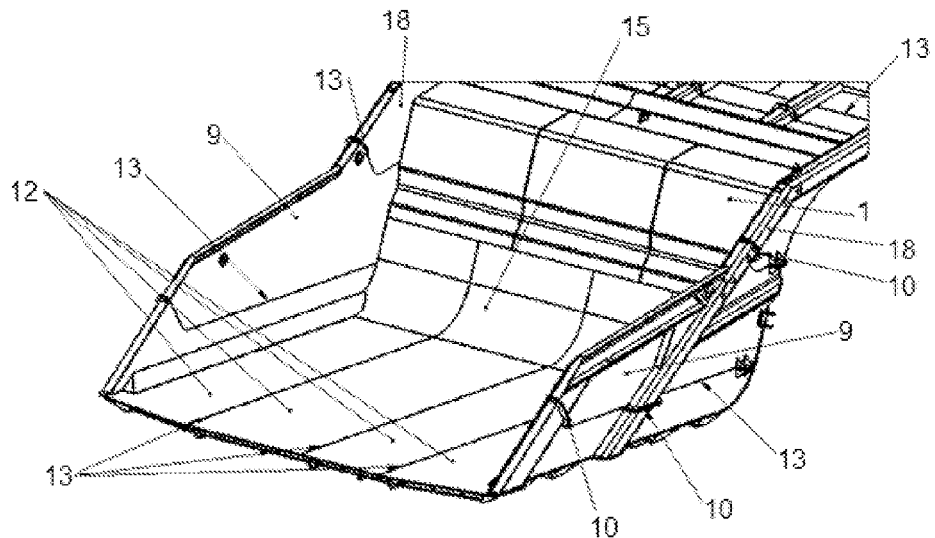
FIG. 4 shows a rear isometric view of the assembled and welded hopper.
Figure 5A:
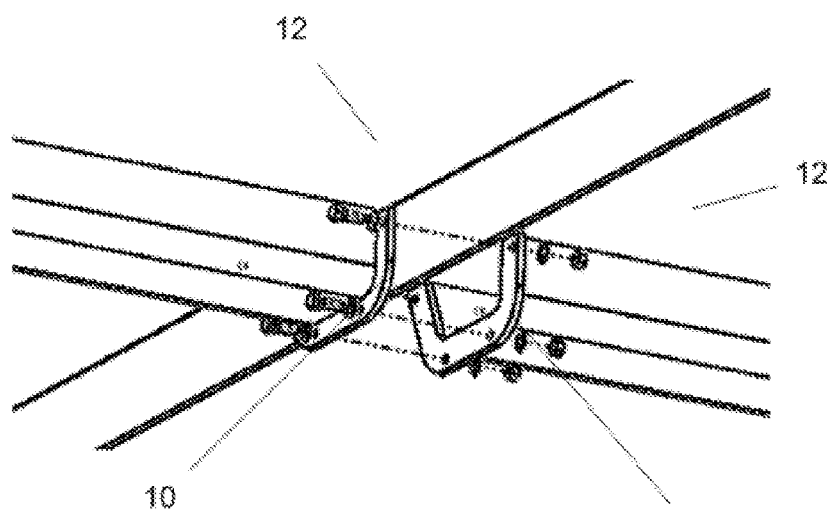
FIG. 5A shows the floor plates before fixing them using flanges and welds.
Figure 5B:
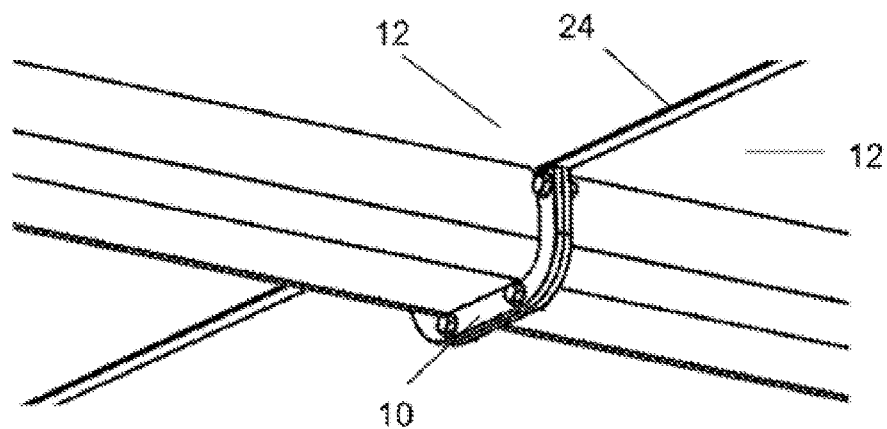
FIG. 5B shows the floor plates after fixing them using flanges and welds.

The hopper is divided as shown in FIG. 3 in which two central floor sections (5,6) are observed, including floor base plates (12) which are curved (15) in the front of the hopper, a front column section (23), a hopper chassis (22); and a plurality of floor beam sections (19) joined to each other, with the right (4) and left (7) side floor sections and the front (1), using joints with flanges (10) and welding (13) of the base plates. The hopper also includes two right (4) and left (7) floor sections, including floor base plates (12) which are curved (15) in the front of the hopper; a lower side section (21); and a plurality of floor beams (19) in which said two right (4) and left (7) floor sections are joined with the two intermediate side sections (3), with the intermediate floor sections (5, 6) and also with the front (1) using flanges (10) and welds (13) of the base plates. Other component parts of the hopper are two intermediate side sections (3) which are joined each on one side with the two front side sections (2), and on the other side with two right (4) and left (7) floor sections, to the floor (12) and the front (1) using flanges (10) and welds (13) in the base plates. In addition, the hopper also comprises two front side sections (2) containing a base plate (18) that join two intermediate side sections (3), the hood (8, 20) and the front (1) using flanges (10) and welds in the base plates. Also part of the hopper is a front part (1) containing two front columns (11), joined to the hood (8), the floor (12) and the sides (2, 3) using flanges (10) and welds in the base plates. Finally, the hopper has two hood parts (8, 20), joined to each other, to the top of the front part (1) using base plate welding and flanges (10) or only welding and to two front side sections (2) using flanges (10) and welds in the base plates.

Figure 6:
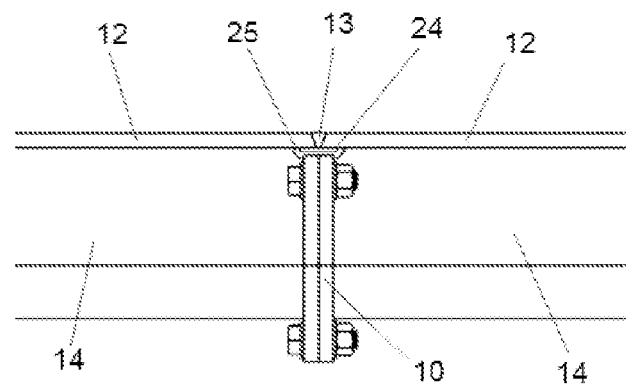
FIG. 6 shows the area of joint of the floor plates with welding after joining with flanges (10).

An important aspect of the hopper of the invention, as shown in FIG. 6, is that welds (13) joining the base plates have no contact with the flanges (10), since they are bounded by a support (24) and because the flanges (10) and the beams have a recess (25) that separates the welded joints from said elements. The support (24) may be metallic or ceramic. This aspect allows to achieve two essential technical objectives: on one hand, the recess (25) prevents the contact of the flange (10) with the welding and, accordingly, the crack caused by the discontinuity inherent in the design of a joint flange (10) and its subsequent spread throughout the joint of the base plates, and on the other hand, thanks to the support (24) located in the recess (25), one can ensure full penetration of the welding (13) of the base plates.

The proposed invention also considers a method for assembling the hopper which consists of:

a) Providing a disassembled hopper.
b) Joining the floor sections (4, 5, 6, 7) using the plurality of flanges (10) in the plurality of floor beams (19).
c) Joining the two intermediate sides (3) using flanges (10) with the left (7) and right (4) floor sections.
d) Joining the two intermediate sides (3) using flanges (10) with two front sides (2), this point may be carried out before point c) optionally, the base plates of these two sets (2, 3) can be welded in this stage.
e) Joining the floor (12) and side (2) plates with the front (1) using flanges (10).
f) Joining the front part (20) of the hood with the back of the hood (8) using flanges (10), optionally, the base plates of these two sets (8, 20) can be welded at this stage.
g) Joining the hood (8) with the front (1) and front sides (2) using flanges (10).
h) Welding the floor plates (12) to each other using longitudinal welding seams (13).
i) Welding the two side plates (9), which form a part of the intermediate side (3), to the upper edge (16) of the right (4) and left (7) floor sections and the lower edge (17) of the plate (18) included in the front side sections (2).
j) Welding the front part (1) to the floor (4, 5, 6, 7) and the intermediate (3) and front (2) sides.
k) Welding the hood (8, 20) to the front (1) and the front sides (2).

Regarding the time of assembly of the hopper, the estimation is one working day for pre-assembly, which means assembling and tightening all joints using flanges, then one more working day is estimated for welding the floor (12) and side plates.

Depending on where the assembly of the hopper is carried out, welding of the base plates can be done manually or robotically. Once the hopper is assembled, it can be welded without any crane support.

What is claimed:

1. A hopper for heavy mining trucks which is moved disassembled and assembled in the construction site in two days, saving time and costs of transport, assembly and use of cranes, comprising:
    a) two central floor sections including:
        floor base plates which are curved in the front of the hopper;
        a front column section;
        hopper chassis; and
        a first plurality of floor beams, which are joined to each other, with the right and left side floor sections and the front using flanges and welds of the plate bases;
    b) two right and left floor sections, including:
        floor base plates which are curved in the front part of the hopper;
        a lower side section; and
        a second plurality of floor beams where said two right and left floor sections join the two intermediate side sections, the intermediate floor sections and also the front part using flanges and welds of the base plates;
    c) two intermediate side sections which are joined each on one side with the two front side sections, and on the other side with two right and left side floor sections, the floor and the front part using flanges and welds in the base plates;
    d) two front side sections containing a base plate which join two intermediate side sections, the hood and the front part using flanges and welds on the base plates;
    e) a front part containing two front columns, joined to the hood, the floor and the sides using flanges and welds on the base plates; and
    f) two hood parts joined to each other, the top of the front part using welding of the base plate and flanges or only welding, and two front side sections using flanges and welds on the base plates.

2. A hopper for mining trucks according to claim 1, wherein the welds joining the base plates have no contact with the flanges since they are bounded by a support and because the flanges and beams have a recess which separates the welded joints from said elements.

3. A hopper for mining trucks according to claim 2, wherein the support may be metallic or ceramic.

\* \* \* \* \*